(12) United States Patent
Haller

(10) Patent No.: US 7,376,585 B2
(45) Date of Patent: May 20, 2008

(54) REAL-TIME SALES INFORMATION ARCHITECTURE

(75) Inventor: Stephan Haller, Karlsruhe (DE)

(73) Assignee: SAP Aktiengesellschaft, Walldorf (DE)

( * ) Notice: Subject to any disclaimer, the term of this patent is extended or adjusted under 35 U.S.C. 154(b) by 314 days.

(21) Appl. No.: 10/373,178

(22) Filed: Feb. 26, 2003

(65) Prior Publication Data

US 2004/0044580 A1 Mar. 4, 2004

Related U.S. Application Data

(60) Provisional application No. 60/407,698, filed on Sep. 4, 2002.

(51) Int. Cl.
*G06Q 30/00* (2006.01)

(52) U.S. Cl. ............... 705/21; 705/23; 705/24

(58) Field of Classification Search ........... 705/16, 705/20, 21, 23, 24, 26, 27; 235/383
See application file for complete search history.

(56) References Cited

U.S. PATENT DOCUMENTS

| | | | |
|---|---|---|---|
| 5,151,684 A | | 9/1992 | Johnsen |
| 5,739,512 A | * | 4/1998 | Tognazzini ............... 235/380 |
| 5,881,315 A | | 3/1999 | Cohen |
| 5,918,211 A | * | 6/1999 | Sloane ..................... 705/16 |
| 5,950,173 A | | 9/1999 | Perkowski |
| 6,148,338 A | | 11/2000 | Lachelt et al. |
| 6,179,206 B1 | * | 1/2001 | Matsumori ................. 235/383 |
| 6,182,143 B1 | * | 1/2001 | Hastings et al. ............ 709/231 |
| 6,185,542 B1 | * | 2/2001 | Moran et al. ............... 705/16 |
| 6,327,576 B1 | * | 12/2001 | Ogasawara ................ 705/22 |
| 6,491,217 B2 | * | 12/2002 | Catan ....................... 235/375 |
| 6,587,835 B1 | * | 7/2003 | Treyz et al. ................ 705/26 |
| 6,873,715 B2 | * | 3/2005 | Kuo et al. .................. 235/380 |
| 2002/0006603 A1 | | 1/2002 | Peterson et al. |
| 2003/0195946 A1 | | 10/2003 | Yang |

FOREIGN PATENT DOCUMENTS

| | | |
|---|---|---|
| EP | 0 967 558 A | 12/1999 |
| GB | 2329301 A | 3/1999 |
| WO | WO 99/09490 | 2/1999 |
| WO | WO02 01467 A | 1/2002 |
| WO | WO 02/073442 A | 9/2002 |
| WO | WO 2004/023430 | 3/2004 |

OTHER PUBLICATIONS

Self Checkout White Paper, Productivity Solutions, Inc., http://www.ps-inc.com/acmwhitepaper.html , (1 of 5), Jan. 2000.

(Continued)

*Primary Examiner*—Gerald J. O'Connor
(74) *Attorney, Agent, or Firm*—Fish & Richardson P.C.

(57) ABSTRACT

A sales information architecture detects user interaction with a tagged item and in response displays product information about the item to the user. The architecture can process a sales transaction involving the item and report the sale in real-time to other enterprises such as manufacturers using a publish subscribe messaging service.

22 Claims, 6 Drawing Sheets

OTHER PUBLICATIONS

Optimal Robotics Self-Checkout, Optimal Robotics Corp., http://web.archive.org/web/20020601163549/www.optimal-robotics.com/products.html (1 of 2), Jun. 2002.

NCR Self-Checkout Systems, "Wakefern to Install NCR Self-Checkout Systems, Leading Supermarket Wholesaler Designates NCR Exclusive Vendor," (1 of 2), NCR News Release, Feb. 7, 2001.

PSI Self-Checkout Solutions, "Self-Checkout Solutions," http://web.archive.org/20020203063139/www.pscnet.com/html/scosolutions.htm (1 of 2), Feb. 2002.

Chappell, David A., "Asynchronous Web Services and the Enterprise Service Bus," [online], [retrieved from the Internet Feb. 10, 2004: http://www.webservices.org/index.php/article/articlprint/352/-1/24/], May 6, 2002, XP002269724, 7 pgs.

Hapner, Mark, et al., "Java Message Service," [online], [retrieved from the Internet Mar. 13, 2001: http://java.sun.com/products/jms/documents.html], Nov. 9, 1999, XP002162780, 111 pgs.

Hewlett Packard, "HP OpenView Integration Guide for Developers," Jul. 2002, [online], [retrieved from the Internet on Mar. 24, 2004: http://h21007.www.2.hp.com/dspp/files/unprotected/OpenView/IntegrationGuide/OV_Integration_Guide_7_30.pdf], pp. 67-92, XP002274908.

Hewlett Packard, "hp OpenView Service Navigator for hp OpenView Operations 7.x for UNIX Product Brief," May 2002, [online], [retrieved from the Internet on Mar. 24, 2004: http://www.pervigil.com/PDF/HP/sernav_pb_jun02.pdf], 2 pgs., XP002274906.

Sun Microsystems, "Developing Web Services with SUN™ Open Network Environment," Mar. 2002, [online], [retrieved from the Internet Mar. 24, 2004: http:www.sun.com/software/sunone/wp-spine/spine.pdf], pp. 1-32, XP002274909.

Trythall, Steve, "JMS and CORBA Notification Interworking," Dec. 12, 2001, [online], [retrieved from the Internet Mar. 24, 2004: http://www.onjava.com/pub/a/onjava/2001/12/12/jms_not.html], 8 pgs., XP002274907.

Eugster, Patrick, et al., "Distributed Asynchronous Collections: Abstractions for Publish/Subscribe Interaction," Agilent Lab. and Lombard Odier Co., Jan. 10, 2000, pp. 1-34, XP002171795.

Shorshita, Teruji, et al., "A Large-scale Contents Distribution Architecture Based on Reliable Multicast," Proceedings Internet Workshop, 1999, IWS '99 Osaka, Japan, Feb. 18-20, 1999, pp. 75-80, XP010365597.

Fitzpatrick, Geraldine, et al., 'Augmenting the Workaday World with Elvin' [online]. Proceedings of ECSCW'99, Sep. 1999, Kluwer Academy Publishers, Copenhagen, Denmark, pp. 431-451 [retrieved on Jan. 26, 2005]. Retrieved from the Internet: <URL: http://dstc.com/Research/Projects/EWP/Papers/ecscw99-dist.pdf>.

Padovitz, Amir, et al., 'Awareness and Agility for Autonomic Distributed Systems: Platform-Independent Publish-Subscribe Event-Based Communication for Mobile Agents,' *Proceedings of the 14th International Workshop on Database and Expert Systems Applications (DEXA '03)*, Sep. 1, 2003, pp. 669-673.

Cheng and Loizou, "A Publish/Subscribe Framework: Push Technology in E-Commerce," *Proceedings of the 17th British National Conference on Databases*, London, UK, 2000, pp. 153-170.

Eugster et al, "Effective multicast programming in large scale distributed systems," *Concurrency and Computation: Practice and Experience*, 2001, 13:421-447.

Banavar, G., et al., "An Efficient Multicast Protocol for Content-Based Publish-Subscribe Systems," Proceedings of the 19th International Conference on Distributed Computing Systems, ICDCS '99, Austin, TX, May 31—Jun. 4, 1999, International Conference on Distributed Computing Systems, Los Alamitos, CA: IEEE Computer Soc., US, May 31, 1999, pp. 262-272, XP000883611.

Segall, Bill and David Arnold, "Elvin Has Left the Building: A Publish/Subscribe Notification Service with Quenching," Distributed Systems Technology Centre, University of Queensland, Sep. 1997, XP002152244 AU, retrieved from the Internet: http://elvin.dstc.edu.au/document/papers/auug97/AUUG97.html.

THE451, "KnowNow Unveils 'N-Way' EAI over the Internet," TechTarget Network, XP002259981, retrieved from the Internet: http://searchwebservices.techtarget.com/orginal/Content/0.289142.sid26_gci75182, 2006.

Triantafillou, P., et al., "Subscription Summaries for Scalability and Efficiency in Publish/Subscribe Systems," Proceedings of the 22nd International Conference on Distributed Computing Systems Workshops (ICDCSW'02), Jul. 2, 2002, pp. 619-624, XP010601590.

\* cited by examiner

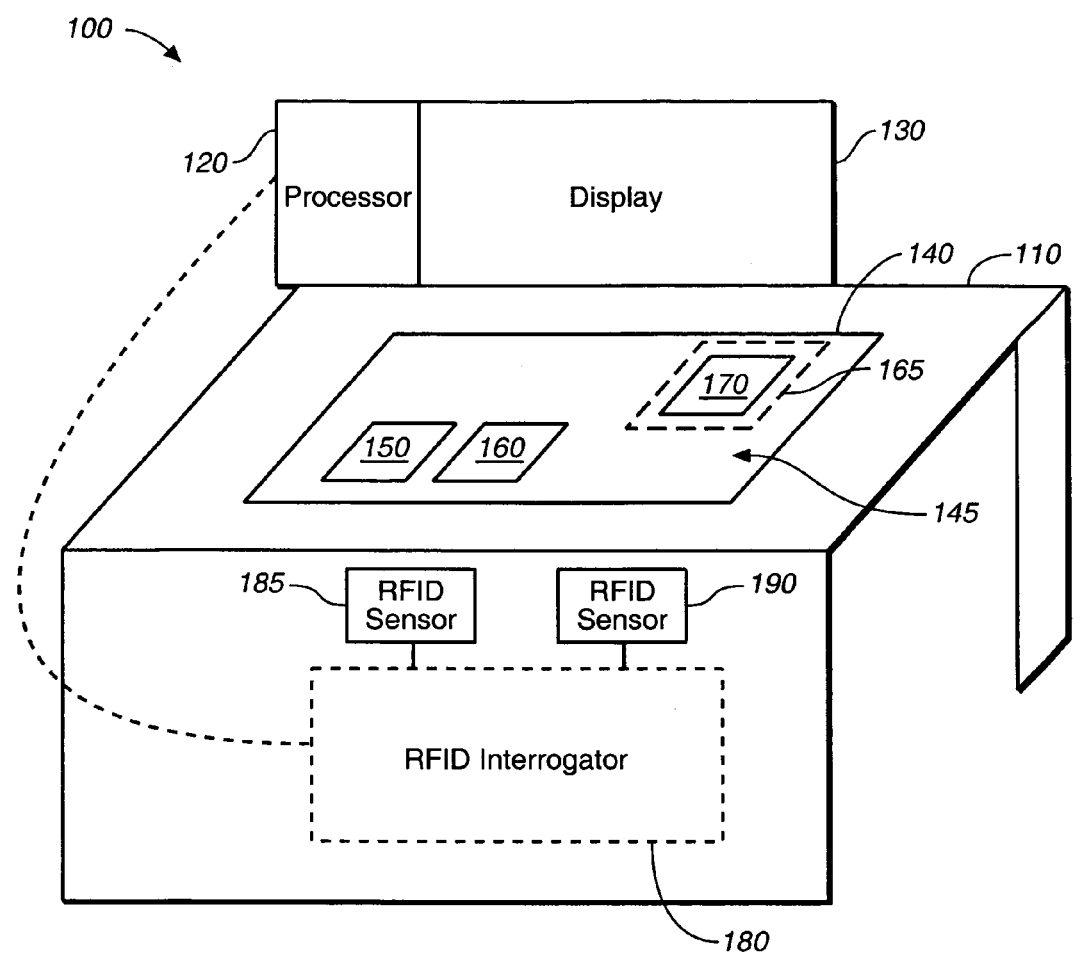
FIG._1

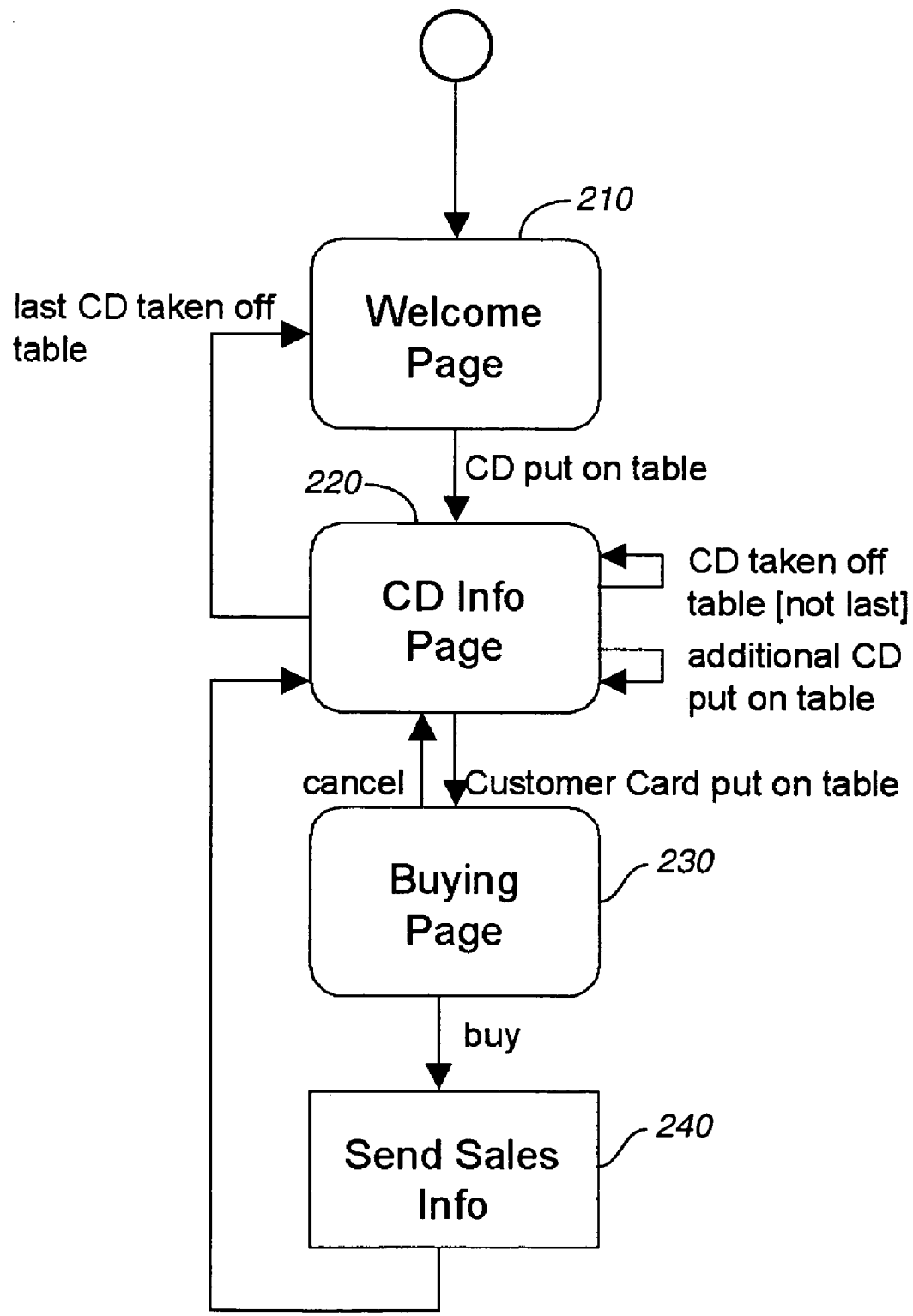
FIG._2

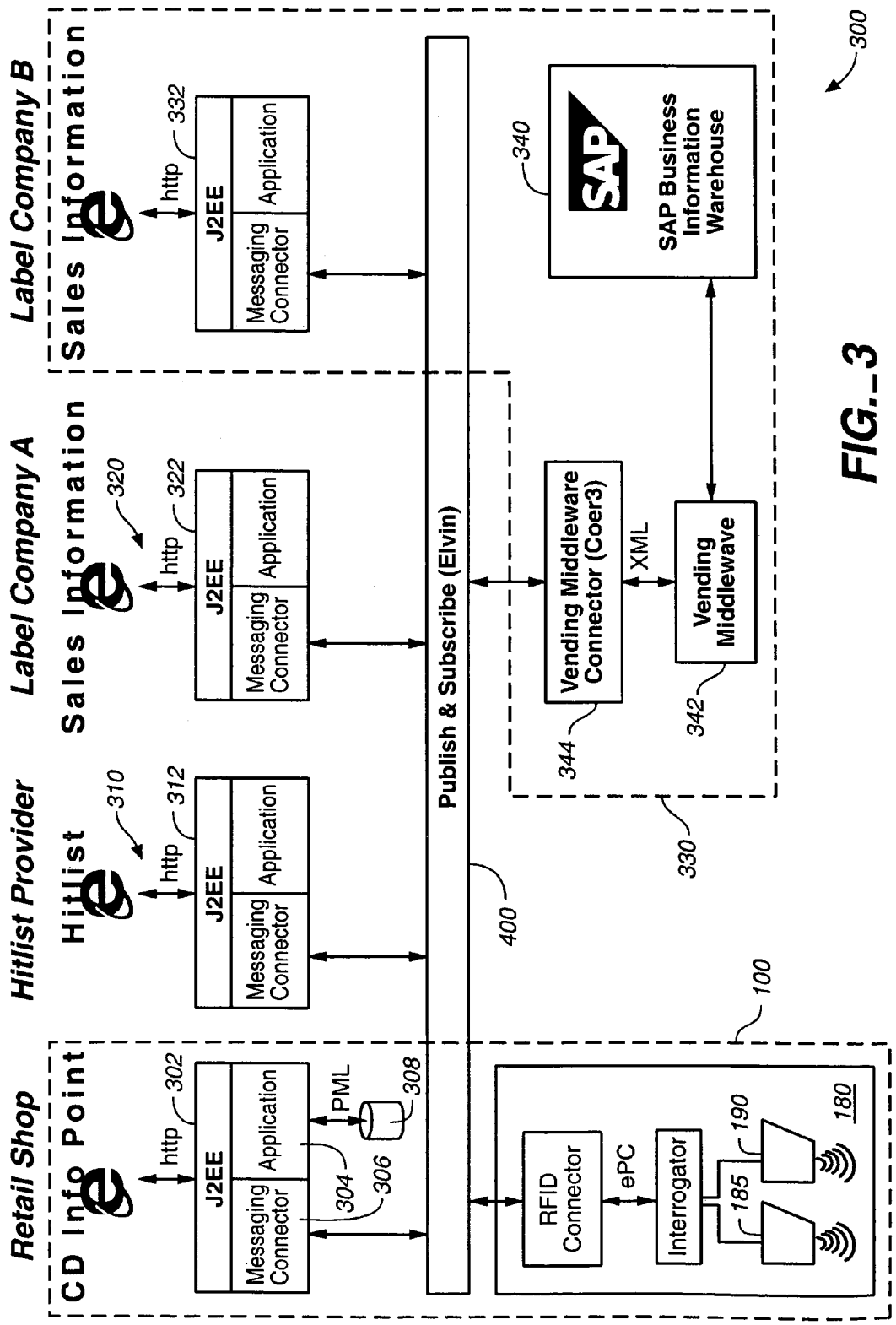
FIG._3

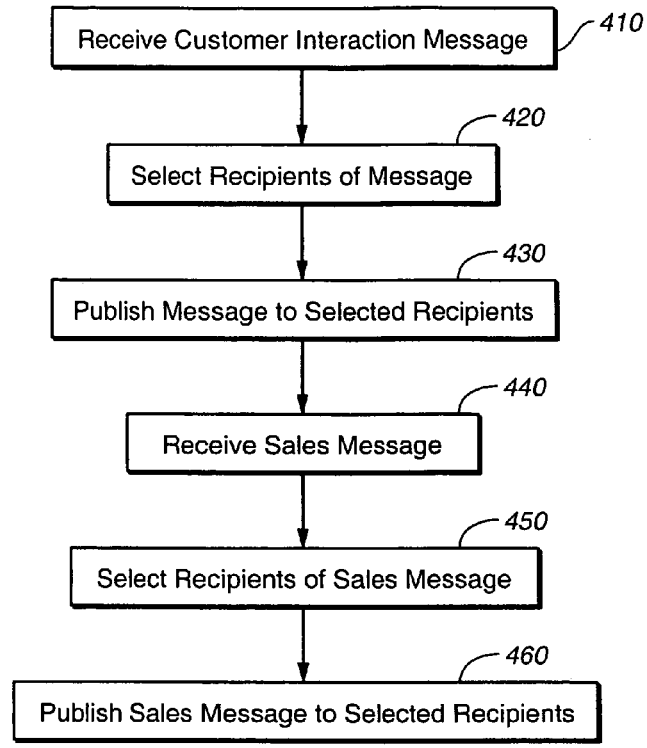
FIG._4
```
<?xml version="1.0" encoding="ISO-8859-1"?>
<PML VERSION="0.10">
    <NODE LABEL="Customer Card" EPC="0106C30CB0C6D01000000001">
        <DATUM TYPE="manuf" LABEL="SAP CD Shop" />
        <DATUM TYPE="prod" LABEL="Customer Card" />
        <DATUM TYPE="serial" LABEL="Hans Muster">
            <FIRSTNAME>Hans</FIRSTNAME>
            <LASTNAME>Muster</LASTNAME>
        </DATUM>
    </NODE>
</PML>
```
FIG._5

```
<?xml version="1.0" encoding="ISO-8859-1"?>
<PML VERSION="0.10">
<NODE LABEL="CD" EPC="0106C30CB0C6D010000000001">
    <DATUM TYPE="manuf" LABEL="A&M Records" />
    <DATUM TYPE="prod" LABEL="The Dream of the Blue Turtles" >
        <ARTIST>Sting</ARTIST>
        <TITLE>The Dream of the Blue Turtles</TITLE>
        <YEAR>1985</YEAR>
        <PRICE CURRENCY="EUR">17.99</PRICE>
        <INFO>This is a cool CD!</INFO>
        <TRACK NR="1" URL="...">If You Love Somebody Set Them Free</TRACK>
        <TRACK NR="2" URL="...">Love Is the Seventh Wave</TRACK>
        <TRACK NR="3" URL="...">Russians</TRACK>
        <TRACK NR="4" URL="...">Children's Crusade</TRACK>
        <TRACK NR="5" URL="...">Shadows in the Rain</TRACK>
        <TRACK NR="6" URL="...">We Work the Black Seam</TRACK>
        <TRACK NR="7" URL="...">Consider Me Gone</TRACK>
        <TRACK NR="8" URL="...">The Dream of the Blue Turtles</TRACK>
        <TRACK NR="9" URL="...">Moon over Bourbon Street</TRACK>
        <TRACK NR="10" URL="...">Fortress Around Your Heart</TRACK>
    </DATUM>
</NODE>
</PML>
```

*FIG._6*

| Attribute Name | Value |
|---|---|
| TICKERTAPE | rfid_tc |
| ePC | <the ePC of the object read, see below> |
| in_field | 0 or 1 |
| tagID | any |

FIG._7

| Attribute Name | Value |
|---|---|
| TICKERTAPE | demo_cd_sale |
| TICKERTEXT | <Title of the album> |
| CD_EPC | <the ePC of the CD read> |
| ProductID | <The product ID of the CD> |
| Label | <name of the music label company> |
| Artist | <name of the artist> |
| Price | <price of the CD> |
| Customer_ePC | <the ePC of the customer card read> |
| Customer_Name | <Firstname Lastname of the customer> |
| StoreID | LISBON02 |
| EventDate | <Date the message was generated> |
| EventTime | <Time the message was generated> |
| EventTimeZone | GMT |

FIG._8

REAL-TIME SALES INFORMATION ARCHITECTURE

CROSS-REFERENCE TO RELATED APPLICATIONS

This application claims priority to U.S. Provisional Application No. 60/407,698 filed on Sep. 4, 2002, the contents of which are incorporated by this reference.

BACKGROUND

The present invention relates to sales information architectures.

Conventional sales information architectures fail to provide information to customers in a timely and comprehensive manner. For example, a customer of a grocery store may wish to know exactly where a product such as beef comes from and how fresh it is before purchasing the beef. To find out this information, the customer typically has to ask the store personnel. Similarly, a customer of a music store may wish to listen to the audio tracks of a CD before purchasing the CD.

Once the item has been purchased, the vendors (retailers or suppliers) may wish to be notified about the sale immediately. For example, in the entertainment industry, the top-selling items in a particular category are often publicized in a hit list or similar benchmark. The appearance of an item in a hit list often helps to promote further sales of the item. Immediate notification of sales also helps vendors to better plan out their replenishment schedules to avoid running out of stock.

SUMMARY

The system features methods and apparatus, including computer program products, for a real-time sales information architecture. In one general aspect, the system includes one or more sales information terminals, one or more external applications, and a messaging service in communication with the sales information terminals and the external applications. Each sales information terminal may be configured to detect an item in proximity to the terminal, display information about the item, process a sales transaction involving the item, and in real time, send a message to the messaging service, the message including information that identifies the customer, the item sold, the terminal, and a timestamp. Each external application is configured to provide subscription information to the message service, and receive from the message service messages that match the subscription information. The messaging service is configured to receive subscription information from each of the external applications, receive messages from the sales information terminals, and in real time, forward each message to the external applications whose subscription information matches the sales message.

Implementations may include a one or more of the following features. For example, each message may include content, the subscription information may include criteria for selecting messages based on the content of the message, and the subscription information may match the message if the content of the message satisfies the criteria included in the subscription information. Each message may include a message topic, the subscription information may include criteria for selecting messages based on the topic of the message, and the subscription information may match the message if the topic of the message satisfies the criteria included in the subscription information. Each item may have a unique identification number (UID) that can be read from a tag attached to the item. The tag may be a radio frequency identification (RFID) tag.

The sales information terminal also may be configured to use the UID to retrieve information about the item from a database. The retrieved information may include a product markup language (PML) document retrieved from a PML server.

The sales information terminal may be located within a first enterprise and the external applications may be located at one or more second enterprises, the first enterprise being different from the second enterprises. The first enterprise may be a retail establishment, and the second enterprises may include a record label company that supplies the retail establishment with records. The first enterprise may be a retail establishment, and the second enterprise may include a hit list provider that provides hitlists identifying top-selling items.

The sales information terminal may include a sensor device configured to detect that an item has entered or left an area in proximity to the information terminal, generate a customer interaction message that identifies the item detected and whether the item has entered or left the area, and send the customer interaction message to the messaging service. The sensor device may be a an RFID interrogator. The sales information terminal also may include a browser application configured to receive a customer interaction message from the messaging service, retrieve information about the item identified in the customer interaction message, and display the retrieved information.

The invention can be implemented to realize one or more of the following advantages. A sales information architecture implemented according to the invention can increase customer loyalty and satisfaction by providing more timely and more complete information to a customer during the purchasing process. The architecture can adapt to a customer's behavior. The architecture can detect when a customer has interacted with an item and can display information about the item as soon as the customer interaction is detected. The user interaction can be performed naturally without the use of a keyboard or other input device.

The architecture can also determine, based on the item that the customer interacts with, related items that may be of interest to the customer and can display information about the related items to the customer.

The architecture can increase sales and prevent replenishment delays by notifying vendors as soon as an item is sold. The sales information can be distributed in real time to an external application that can be located in a different enterprise from the enterprise where the sale took place. The distribution can be controlled such that each enterprise only receives information for which it is authorized to receive.

The sales information can be used to support higher-level processing such as hitlist compilation, customer profiling, and sales pattern analysis.

The details of one or more implementations are set forth in the accompanying drawings and the description below. Other features and advantages will become apparent from the description, the drawings, and the claims.

BRIEF DESCRIPTION OF THE DRAWINGS

FIG. 1 is a block diagram illustrating one implementation of an information terminal.

FIG. 2 is a flow diagram illustrating data flow within the information terminal.

FIG. 3 is a block diagram illustrating one implementation of a sales messaging architecture.

FIG. 4 is a flow diagram illustrating data flow within the sales messaging architecture.

FIG. 5 illustrates a PML document for a customer card.

FIG. 6 illustrates a PML document for a CD.

FIG. 7 illustrates information that can be included in a customer interaction message.

FIG. 8 illustrates information that can be included in a sales message.

Like reference symbols in the various drawings indicate like elements.

DETAILED DESCRIPTION

Referring to FIG. 1, an information terminal 100 is shown within an exemplary entertainment media, retailing environment where customers may purchase items, such as compact discs (CDs) and other entertainment media (e.g., digital video discs (DVDs), books, e-books, and video games). Each item (e.g., a CD) within the store may have an associated radio frequency identification (RFID) tag. The RFID tag includes a unique system identifier (UID) that uniquely identifies the item. In one implementation, the UID is an electronic product code (ePC). The information terminal 100 includes RFID sensor technology that may be used to read the RFID tags associated with the items.

After an RFID tag is read, the customer may perform various actions and transactions using the terminal. For example, the customer may sample various tracks of a CD (e.g., the terminal 100 may automatically begin playing when the RFID tag is read), view tracks of a DVD, and obtain information about the item being displayed. Using the information terminal 100, the customer may navigate through various levels of information associated with the item. The customer also may use the terminal 100 to purchase the item by completing a sales transaction.

As shown in FIG. 1, the information terminal 100 includes a support structure 110 (e.g., a table structure), a processor 120, a touch screen display 130, and a sensor area 140 (e.g., formed as part of the top surface of the support structure 110). The display 130 enables product and purchasing information to be exchanged with the customer. Generally, the display 130 may include a monitor or LCD ("Liquid Crystal Display") configured to show information related to products that are placed on or within range of the sensor area 140. The display 130 may include a touch screen that enables a customer to select items or options that are displayed on the screen. For example, the customer may select which track to demo on a CD.

The sensor area 140 includes a region of the support structure 110 configured to enable items placed on a product pad 145 to have their RFID tag interrogated. The product pad 145 may include a plastic insert with a RFID sensor system beneath the plastic insert. The plastic insert may include illustrations indicating where products should be placed. The product pad 140 also may include a special region 165 configured to interrogate a customer card 170. For example, the product pad 140 may include and/or incorporate a special sensor designed to interrogate customer cards 170. In another example, the same RFID sensor may be used for a customer card 170 and the CDs 150 and 160. The terminal 100 also may include a special device configured to accommodate a security card, for example, a card reader configured to reduce the likelihood of theft or unauthorized use.

An RFID interrogator 180 may be located under the sensor area 140. The RFID interrogator includes one or more RFID sensors 185, 190 that may detect and/or read the RFID tags associated with the items. The RFID interrogator 180 may be connected to the processor 120, or alternatively may be connected to a publish and subscribe network, described in more detail below.

Two CDs 150 and 160 and a customer card 170 are shown resting within the sensor area 140 to illustrate how a customer may interact with the information terminal 100. Each CD 150, 160 and the customer card 170 include an RFID tag that can be read by the interrogator 180. Although the following example refers to CDs as the item being purchased, any type of item available for retail sale may be used with the terminal 100.

The support structure 110 may include a table, a shelf, a stand, a display rack or other piece of furniture suitable for a retail environment that can support the information terminal 100 and its components. The support structure 110 also may include devices configured to route cables, wires, and other peripheral and interconnecting equipment. The display 130 may be mounted in a supporting frame as part of the support structure 110 to position the display 130 closer to the customer's eye level and/or to enable the customer to easily reach the touch screen display 130.

The processor 120 may include a computing device, such as a personal computer configured to communicate on a network and run a browser style user interface. The processor 120 also may support audio peripherals including headphones for listening to audio files and/or tracks listed on a particular CD. Additionally, the processor 120 may be connected to external audio speakers forming part of the support structure 110.

FIG. 2 illustrates a flow chart describing an exemplary operation of the information terminal 100. With continued reference to the music-retailing example, an inventory of entertainment media, such as CDs are located near the information terminal 100. A customer approaching the information terminal 100 is initially greeted by a welcome page (step 210) presented using the browser style user interface on the touch screen display 130. The welcome page invites the customer to place an item (such as an RFID tagged CD 150) on the sensor area 140 to obtain more information about the CD. The welcome screen is displayed when there are no items on the table 110.

When CD 150 is placed within the sensor area 140, the RFID tag associated with the item is detected and read by the RFID interrogator 180, and a CD information page is presented (step 220) on the touch screen display 130. Once the CD information is displayed, the customer has several options for interacting with the terminal 100. One option is to place another item (e.g., CD 160) on the sensor area 140. When the second RFID tagged CD 160 is detected, the CD information page updates with information identifying both CDs 150 and 160. Another option is for the customer to remove items from the sensor area 140. When a CD is removed and the RFID tag for that item is no longer detected, the CD information page is updated and displays only that information for the remaining CDs. When the last item is removed and no more RFID tagged items are detected by the RFID interrogator 180, the information terminal 100 returns the welcome page to the display 130 (step 210).

Using the UID for each item, the processor 120 may access a local database of information about the CDs 150 and/or 160. In one implementation, the processor 120 uses the UID as a key to query a product markup language (PML)

server that serves PML files. A PML file is a markup language file that contains information about a given product. Two examples of a PML file are shown in FIGS. 5 and 6. As shown in FIG. 6, the information about the CD may include an artist name, an album title, a track listing, a price, and test information. The database also may include pre-recorded digital audio files (e.g., MP3 files) for each track on CD 150. In one exemplary implementation, the first track of the CD begins playing when the RFID of the CD is successfully detected, read, and/or identified by the information terminal 100. Each time a new CD is placed on the sensor area 140 and successfully identified, the CD information page updates and the first track of the new CD begins playing.

The CD information page may include track navigation tools that allow the customer to change the track being played. For example, the touch screen display 130 may include track forward and track reverse buttons to begin playing the next or the previous track. The display 130 also may include pause, fast-forward, and rewind buttons enabling the customer to further control playback.

The CD information page also may include a sidebar listing all items on the table. The sidebar list may include a short capsule for each CD showing the artist name, the album title, and, optionally, the number of CDs displayed may be included in the sidebar list. Detailed information about the CD (e.g., complete track listing, cover artwork, artist biography, and reviews) may be displayed in a larger frame appearing to the right of the sidebar list. The customer may use the sidebar list to navigate between CDs or items on the table 110. As items are removed from the table 110, the item may be removed from the sidebar list. As additional CDs are placed on the table 110, the most recently placed CD may be placed at the top of the sidebar list, and the detailed information for that CD presented in the larger frame.

Another option allows the customer to purchase one or more of the CDs listed on the CD information page. The customer initiates the purchase by placing their RFID customer card 170 within the sensor area 140. When the RFID tag associated with the customer card 170 is detected, read and/or verified, a buying page is presented on the display 130 (step 230).

The buying page provides information about the customer including the customer name, information about each CD within the sensor area 140, and the total price for purchasing all of the CDs. At this point, using the touch screen, the customer may select "remove" to remove the CD from the list of CDs to be purchased, "cancel" to end the purchase transaction and return to the CD information page, or may select "buy" to complete the purchase transaction. If "buy" is selected, a message containing the customer information, information on all CDs purchased, store location, and a timestamp are sent to the publish and subscribe system 400 by the processor 120.

In one implementation, a store security system may receive information about which CDs have been purchased so that an RFID security detection system at the store entrance can allow the CDs to pass without triggering a security alarm.

FIG. 3 shows a messaging architecture 300 that enables the information terminal 100 and the RFID interrogator 180 to communicate with other systems and applications by way of a network based publish and subscribe system 400. The other systems and applications can be located in a different enterprise from the information terminal 100.

An application running on the information terminal 100 can be represented as a J2EE servlet 302 that includes an application component 304 and a messaging connector 306. The servlet 302 may generate the HTML code for the browser based user interface presented on the touch screen display 130. The application component 304 handles all of the program functions needed to implement the information terminal 100 and is able to access a database 308. The database 308 contains information including information about each item within the retail store, customer information, and the pre-recorded digital audio files. The database 308 also may contain information about sales transactions completed for that store. The messaging connector 306 provides communication of messages between the servlet 302 and the publish and subscribe system 400.

The messaging architecture 300 allows other applications to communicate with the information terminal 100 using the publish and subscribe system 400. In the exemplary implementation shown, a hitlist provider 310, a first record label company 320, and a second record label company 330 each have servlets 312, 322, and 332, respectively, that communicate with the publish and subscribe system 400. The second record label company 330 also may have a business information system 340 connected to the publish and subscribe system 400 by way of vending middleware 342 and a vending middleware connector 344.

The publish and subscribe system 400 may be enabled using content based messaging system, such as, CosNotif, JMS, Keryx, Gryphon, or ELVIN. In one implementation, ELVIN software system available from the Distributed Systems Technology Center of Australia may be used. Other types of publish and subscribe systems can also be used to implement messaging architecture 300. For example, a topic-based system such as the KnowNow event router available from KnowNow Inc. of Sunnyvale, Calif. may be used.

Generally, publish and subscribe (PS) services enable a PS agent of the processor 120 to publish a message to a content based messaging (CBM) or publish subscribe network to be forwarded to one or more recipients. The intermediate system associated with the PS service receives messages and notifies any recipients that subscribe to the messages.

The processor 120 may configured as a client in a client-server architecture for delivering notifications. The processor 120 (e.g., a PS client) may establish a session with the information warehouse (e.g., a PS server) to publish messages for delivery, and/or register a subscription to receive notifications. The processor 120 and other PS agents may act as both publishers of and subscribers to information within the same session.

The task of an information warehouse, PS server, or router, is to manage connections, manage received messages, compute subscriptions, and route notifications to PS subscribers. PS subscribers express their interest in a notification by registering a subscription with the PS server. The subscription provides selection criteria based on the content of each message. When the PS server receives a message, the PS server computes the subscription by matching the content of the message against the registered subscriptions. The PS server forwards a notification to each client that is determined to match a registered subscription. A single message may be matched to one or more subscriptions that are delivered to all active (e.g., online) PS clients.

An advantage of the extended PS services is that messages are not addressed to a single recipient (like a letter), or even a specific group (like a notice board). PS publishers do not have to determine where the information should be routed. PS subscribers may select to receive only the messages that are of interest.

The processor 120 may send messages and receive notifications that are simple, yet extensible. A PS message may include a list of name-value elements. Because a PS agent does not use any single part of the message to specify delivery, applications are free to send messages and receive notifications with fields that are not necessarily used by the clients, allowing applications built in the PS system to evolve over time.

PS messages are delivered based on their content, so the recipient may describe the messages of interest. The subscription, expressed in a simple syntax, may be used to match published messages of interest. After establishing a connection, one or more subscriptions may be sent to the PS server. While a client remains connected, all matching notifications are delivered via the connection.

The subscription language used in the PS process may use a matching functionality. Subscriptions may be composed from logical expressions across the values of a notification using a syntax similar to C. Expressions may access all elements in a published message.

FIG. 4 illustrates one example of data flow within the sales messaging architecture. The data flow begins with the PS system 400 receiving a customer interaction message from the RFID interrogator 180 (410). A customer interaction message is a message that is generated by the RFID interrogator 180 upon detecting the movement of an item (e.g., placement or removal of an item onto or from the product pad 140). FIG. 7 illustrates one example of a customer interaction message. As illustrated, the customer interaction message can include information identifying the item (e.g., the ePC shown) and identifying the type of the movement that was detected (e.g. the in_field shown).

The PS system 400 compares the customer interaction message against the selection criteria provided by each of the subscribers to select which subscribers to send the customer interaction message to (420). As described earlier, the selection criteria can be content-based or topic-based and a single message can be matched to more than one subscriber. The selected subscribers can include subscribers located in different enterprises.

The PS system 400 publishes the customer interaction message (430) to the selected subscribers which can include, for example, the information terminal. Upon receiving the customer interaction message from the PS system 400, the information terminal 100 can perform a variety of operations as described earlier with respect to FIG. 2.

The PS system 400 receives a sales message from the information terminal 100 (440). A sales message is a message that is generated by the information terminal 100 upon completing a sales transaction for an item. FIG. 8 illustrates one example of a sales message. As shown, the sales message can include information identifying the item sold, the customer who purchased the item, and the store where the sale took place.

The PS system 400 selects which subscribers to publish the sales message to (450) and publishes the sales message (460) to the selected subscribers. These steps are similar to steps 420 and 430.

The sales messaging architecture 400 can be used to support a number of higher-level applications including, but not limited to the following:

Hitlist Compilation

A hitlist is a list of the top-selling items in a given category. Hitlists are commonly used in the entertainment industry where a manufacturer such as a record label company may purchase a hitlist from a hitlist provider. A hitlist provider can use the sales messaging architecture 400 to receive sales information from a retail site such as the information terminal 100. The hitlist provider can then use the architecture 400 to publish the information to a record label company.

Customer Profiling

Customer profiling is commonly used in the retail industry to track the purchasing behavior of a customer for the purpose of anticipating the customer's future purchasing behavior. Based on the fact that the customer has interacted with or purchased a particular item, the retailer can select one or more related items and promote the related items to the customer. An entity such as a retailer can use the sales messaging architecture 400 to receive customer interaction or sales information from an information terminal 100 and to send additional information about the item or about related items to the information terminal 100.

Sales Pattern Analysis

Using the sales messaging architecture 400, customer interaction and sales information can be collected over a period of time and then analyzed for patterns. For example, the analysis may reveal that a particular CD is often sampled but seldom purchased while another CD is often purchased without being sampled.

The system and method described herein can be implemented in digital electronic circuitry, or in computer hardware, firmware, software, or in combinations thereof. The system and methods can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

The application running on the information terminal 100 may be written in any number of programming languages and/or environments. The application may be a Java based application running on the processor 120. For example, the information terminal may be running a J2EE application that generates these displays. These Java applications may be launched from within a web browser. A hidden frame may be used to check if the data needs to be refreshed. For example, there may be coupons or updates that should be generated within the display. These updates may be transmitted and/or received through the publish and subscribe system (described previously). These updates may include e-coupons, promotions, and/or pricing and inventory information. The CD data and the customer data may be stored in a PML ("Precision Markup Language") file that resides locally on the information terminal. Alternatively, these files may reside on a network device enabling network access to a common set of resources.

There may be other devices that receive the information terminal updates that are accessible through the publish and subscribe system. For example, a record label may receive updates from a retail vendor. For example, record label participant in the PS ("Publish and Subscribe") system may access a hitlist showing all sales. Alternatively, the record label participant may show all sales of a specific label. The sales and inventory data may be used to generate a report on the sales of one label.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device such as a CRT (cathode ray tube) or LCD (liquid crystal display) monitor for displaying information to the user and a keyboard and a pointing device such as a mouse or a trackball by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input.

The invention can be implemented in a computing system that includes a back-end component, e.g., as a data server, or that includes a middleware component, e.g., an application server, or that includes a front-end component, e.g., a client computer having a graphical user interface or an Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

The invention has been described in terms of particular embodiments. Other embodiments are within the scope of the following claims. For example, although the invention has been described in terms of an RFID implementation, one skilled in the art can appreciate that any other kind of automated identification system can be used, for example, bar codes.

Furthermore, although the examples above describe a retail music environment where information about CD's could be accessed, other retail environments may be supported by the system. For example, a restaurant or supermarket could also be supported through the information terminal (though there may be some environmental modifications). For example, the restaurant may offer nutritional information while a supermarket may feature a belt so that a larger number of items could be examined and/or purchased in a shorter period of time.

What is claimed is:

1. A device comprising:
   a radio frequency identification (RFID) interrogator generating a customer interaction message based upon a customer interaction resulting in a rendering of media content associated with an entertainment media item, the customer interaction message including item identifying information, and interaction type information;
   a processor generating a sales message based upon the customer purchasing the entertainment media item, the sales message including item identifying information, customer information, and store location information; and
   a publish and subscribe module:
      receiving, from the RFID interrogator, customer interaction selection criteria from at least a first enterprise application and sales selection criteria from at least a second enterprise application,
      receiving, from the RFID interrogator, the customer interaction message and the sales message,
      automatically comparing the customer interaction message against the customer interaction selection criteria to select an interaction subscriber list, the interaction subscriber list including at least the first enterprise application,
      automatically publishing the customer interaction message to the interaction subscriber list,
      automatically comparing the sales message against the sales selection criteria to select a sales subscriber list, the sales subscriber list including at least the second enterprise application, and
      automatically publishing the sales message to the sales subscriber list.

2. The device of claim 1, wherein the entertainment media item further comprises a compact disc (CD), a digital versatile disc (DVD), a book, an electronic book, or a video game.

3. The device of claim 1, wherein the customer interaction further comprises sampling a track of the electronic media item, viewing a track of the electronic media item, playing a track of the electronic media item, requesting information about the electronic media item, navigating through information associated with the electronic media item, or navigating through portions of the electronic media item.

4. The device of claim 1, further comprising:
   a support structure; and
   a touch screen display configured to display product information associated with the electronic media item and purchasing information associated with the customer purchasing the entertainment media item.

5. The device of claim 1, wherein the RFID interrogator further comprises at least one RFID sensor configured to detect an RFID tag associated with each entertainment media item.

6. The device of claim 5, wherein the RFID interrogator is further configured to detect a customer card.

7. The device of claim 6, further comprising a display configured to display a buying page, the buying page including information about each entertainment media item and a purchase price based upon detecting a customer card with the RFID interrogator.

8. The device of claim 7, wherein the processor is configured to generate a sales message based upon a customer selecting a purchase control on the buying page.

9. The device of claim 1, wherein the first enterprise application is a hit-list provider enterprise application, or a record label enterprise application.

10. A method comprising:
receiving, at a publish and subscribe module, customer interaction selection criteria from at least a first enterprise application and sales selection criteria from at least a second enterprise application;
receiving, at the publish and subscribe module a customer interaction message based upon a customer interaction resulting in a rendering of media content associated with an entertainment media item from a radio frequency identification (RFID) interrogator, the customer interaction message including item identifying information, and interaction type information;
automatically comparing, at the publish and subscribe module, the customer interaction message against the customer interaction selection criteria to select an interaction subscriber list, the interaction subscriber list including at least the first enterprise application;
automatically publishing, at the publish and subscribe module, the customer interaction message to the interaction subscriber list;
receiving, at the publish and subscribe module, a sales message based upon the customer purchasing the entertainment media item from a processor, the sales message including item identifying information, customer information, and store location information;
automatically comparing, at the publish and subscribe module, the sales message against the sales selection criteria to select a sales subscriber list, the sales subscriber list including at least the second enterprise application; and
automatically publishing, at the publish and subscribe module, the sales message to the sales subscriber list.

11. The method of claim 10, further comprising reading a radio frequency identification (RFID) tag associated with the entertainment media item.

12. The method of claim 11, wherein the REID tag includes a unique system identifier (UID) which uniquely identifies the entertainment media item.

13. The method of claim 12, wherein the UID is an electronic product code (ePC).

14. The method of claim 12, further comprising accessing a product database based upon the UID, the product database including product information for each entertainment media item.

15. The method of claim 14, wherein the product information includes an artist name, an album title, a track listing, a price, test data, or digital audio files.

16. The method of claim 12, further comprising automatically playing a portion of the entertainment media item, based upon the UID.

17. The method of claim 10, further comprising prompting a user to place the electronic media item on a sensor area.

18. The method of claim 10, further comprising displaying an entertainment media item information page on a touch screen display.

19. The method of claim 10, further comprising:
reading first and second RED tags each associated with a first and second entertainment media items, respectively, using an RFID sensor;
displaying first and second information pages associated with the first and second entertainment media items, respectively, on a display;
detecting that the second RED tag has been removed from the RFID sensor;
removing the second information page from the display;
detecting that the first RFID tag has been removed from the RFID sensor; and
removing the first information page from the display.

20. The method of claim 10, further comprising transmitting the sales message to an RFID security detection system, thereby preventing the entertainment media item from triggering the RFID) security detection system.

21. A computer program product tangibly embodied in a machine-readable storage medium, wherein the computer program product comprises instructions that, when read by a machine, operate to cause data processing apparatus to:
receive, at a publish and subscribe module, customer interaction selection criteria from at least a first enterprise application and sales selection criteria from at least a second enterprise application;
receive, at the publish and subscribe module, a customer interaction message based upon a customer interaction resulting in a rendering of media content associated with an entertainment media item from a radio frequency identification (RFID) interrogator, the customer interaction message including item identifying information, and interaction type information;
automatically compare, at the publish and subscribe module, the customer interaction message against the customer interaction selection criteria to select an interaction subscriber list, the interaction subscriber list including at least the first enterprise application;
automatically publish, at the publish and subscribe module, the customer interaction message to the interaction subscriber list;
receive, at the publish and subscribe module, a sales message based upon the customer purchasing the entertainment media item from a processor, the sales message including item identifying information, customer information, and store location information;
automatically compare, at the publish and subscribe module, the sales message against the sales selection criteria to select a sales subscriber list, the sales subscriber list including at least the second enterprise application; and
automatically publish, at the publish and subscribe module, the sales message to the sales subscriber list.

22. A method comprising:
receiving, at a publish and subscribe module, customer interaction selection criteria enabling selection of an interaction subscriber list with which to publish a received customer interaction message from at least a first enterprise application, and sales selection criteria enabling selection of a sales subscriber list to publish received sales messages from at least a second enterprise application;
receiving, at the publish and subscribe module, a customer interaction message based upon a customer interaction resulting in a rendering of media content associated with an entertainment media item from a radio frequency identification (RFID) interrogator, the customer interaction message including item identifying information, and interaction type information;

automatically comparing, at the publish and subscribe module, the customer interaction message against the customer interaction selection criteria to select an interaction subscriber list to publish the received customer interaction message based upon on an identification of the content of the customer interaction message as corresponding to a customer interaction, the interaction subscriber list including at least the first enterprise application;

automatically publishing the customer interaction message to the interaction subscriber list including the first enterprise application based upon the selected interaction subscriber list;

receiving, at the publish and subscribe module, a sale message based upon the customer purchasing the entertainment media item from a processor and, the sales message including item identifying information, customer information, and store location information;

automatically comparing, at the publish and subscribe module, the sales message against the sales selection criteria to select a sales subscriber list to publish the received sales message based upon on an identification of the content of the sales message as corresponding to a sales, the sales subscriber list including at least the second enterprise application;

automatically publishing, at the publish and subscribe module, the sales message to the sales subscriber list including the second enterprise application.

\* \* \* \* \*